March 5, 1957 J. F. DRESCHER 2,784,327
IMPULSE GENERATOR

Filed May 9, 1955 2 Sheets-Sheet 1

INVENTOR.
JOHN F. DRESCHER
BY Elliott & Pastoriza
ATTORNEYS

March 5, 1957

J. F. DRESCHER 2,784,327

IMPULSE GENERATOR

Filed May 9, 1955

INVENTOR.
JOHN F. DRESCHER
BY *Elliott & Pastoriza*
ATTORNEYS

United States Patent Office 2,784,327
Patented Mar. 5, 1957

2,784,327

IMPULSE GENERATOR

John F. Drescher, Santa Monica, Calif.

Application May 9, 1955, Serial No. 506,821

14 Claims. (Cl. 310—36)

This invention relates generally to impulse generators which are employed to provide a relatively short-time pulse of electrical energy. The novel features of the present invention relate more particularly to an improved actuating assembly for use with impulse generators.

Impulse generators are well known in the art and are used in a variety of applications, although principally as a source of emergency electrical power or as a means of providing a momentary pulse of electrical energy where conventional electrical distribution facilities are not available or feasible. For example, they may be used with mining devices, railway signals, alarm systems, flash bulbs, to operate solenoids, and the like. More recently they have been frequently utilized as an emergency source of power in connection with the explosive ejection of jettisonable fuel tanks, pilot compartments, parachutes, and bombs for aircraft.

It will be appreciated that the use of impulse generators in association with aircraft or other airborne equipment necessitates that the generators meet stringent operational requirements, which are not normally imposed in industrial applications. It is with respect to such use that the improved actuating assembly of the present invention is addressed. However, it will be apparent that the inventive features embodied in this improved actuating means for impulse generators are of importance and value in other less demanding applications.

In general, the principal of all impulse generators is the same; that is, the use of a mechanical force as a means of momentarily setting up an electromagnetic interaction which results in an induced electrical current and wattage output. In one conventional form, the impulse generator includes two permanent bar magnets which form a part of a closed magnetic circuit with a flux path in a given direction. Connected into the circuit is a movable core with a wire coil encircling it. A lever arm or other mechanical device is adapted to effect movement of the core so as to establish a different magnetic circuit which will reverse the path of flux through the core. While the reversal of flux is taking place, there will be induced in the wire coil a voltage value dependent on the rate of change of flux through the core and the number of turns of wire in the coil.

An inherent problem in the manufacture of present day impulse generators has been to increase the speed of the core movement and at the same time decrease the mechanical force necessary to effect the movement. Thus, with the solution to this problem, a relatively high wattage output can be achieved with a minimum expenditure of mechanical force. The mechanical force used must not only be sufficient to move the core, but it must also be sufficient to overcome the magnetic attraction tending to hold the core in its original position, and it follows that this magnetic attraction will have a high value if a relatively high value of wattage output is to be maintained.

A further difficulty is encountered in that it is normally desirable to have the lever arm or other mechanical device restored automatically to its original position so that, if necessary, repeat operations may be effected. This is of extreme importance where the impulse generator is used as an emergency source of power and the possibility exists that the initial surge of power may not be enough to accomplish the intended result. Thus, at the same time provision is made for decreasing the mechanical force required and increasing the speed of core movement, further means must be incorporated into the actuating assembly which will provide for the automatic return of the lever arm and core to their initial positions.

The complexity of these problems is further magnified where aircraft and other airborne applications are involved in which spatial and weight limitations are of the utmost importance.

It is therefore an object of the present invention to provide an improved actuating means for an impulse generator which is adaptable to operation by a relatively small mechanical force.

Another object is to provide an actuating means which will act to provide a relatively high rate of change of flux by moving the core rapidly through the magnetic field.

Another object is to provide an actuating means which includes means for automatically restoring the lever arm and core to their original positions after operation of the impulse generator.

A further object is to provide an actuating means that is susceptible of complying with relatively exacting spatial and weight limitations such as may be encountered in airborne applications.

Briefly, these and other objects and advantages of the present invention are attained by providing an actuating spring coupled to the core. The actuating spring has one portion so disposed as to bias the core from a first given position towards a second given position when the lever arm is forced, for example, in a downward direction. Similarly, the actuating spring has another portion so disposed as to bias the core from the second given position towards the first given position when the lever arm is urged in an upward or opposite direction.

There is additionally provided a booster spring which is also coupled to the lever arm and has a portion so disposed as to preload the actuating spring in a direction acting to bias the core towards its second given position. This booster spring not only serves to materially decrease the mechanical force required for operation of the lever arm in a downward direction, but it also serves to supplement the mechanical force with a quick acting stored energy means increasing the rate of movement of the core through the magnetic field. It will also be apparent, in the embodiment chosen for illustrative purposes, that the booster spring acts to distribute the operating forces, thereby lessening the possibility of fatiguing of the actuating spring.

In order that the impulse generator may be self-restoring, a return spring is included as part of the actuating means. This return spring is also preferably coupled to the lever arm and has a portion so disposed as to bias the lever arm in an upward direction, thereby urging the core towards its first given position. The return spring is suitably designed so that it exerts sufficient force to overcome the effect of the booster spring and the magnetic attraction on the core, whereby the core will always be returned to its first given position or normal position in the embodiment to be described.

A better understanding of this improved form of actuating means for an impulse generator, according to the present invention, will be had by reference to the following drawings, in which.

Figure 1:
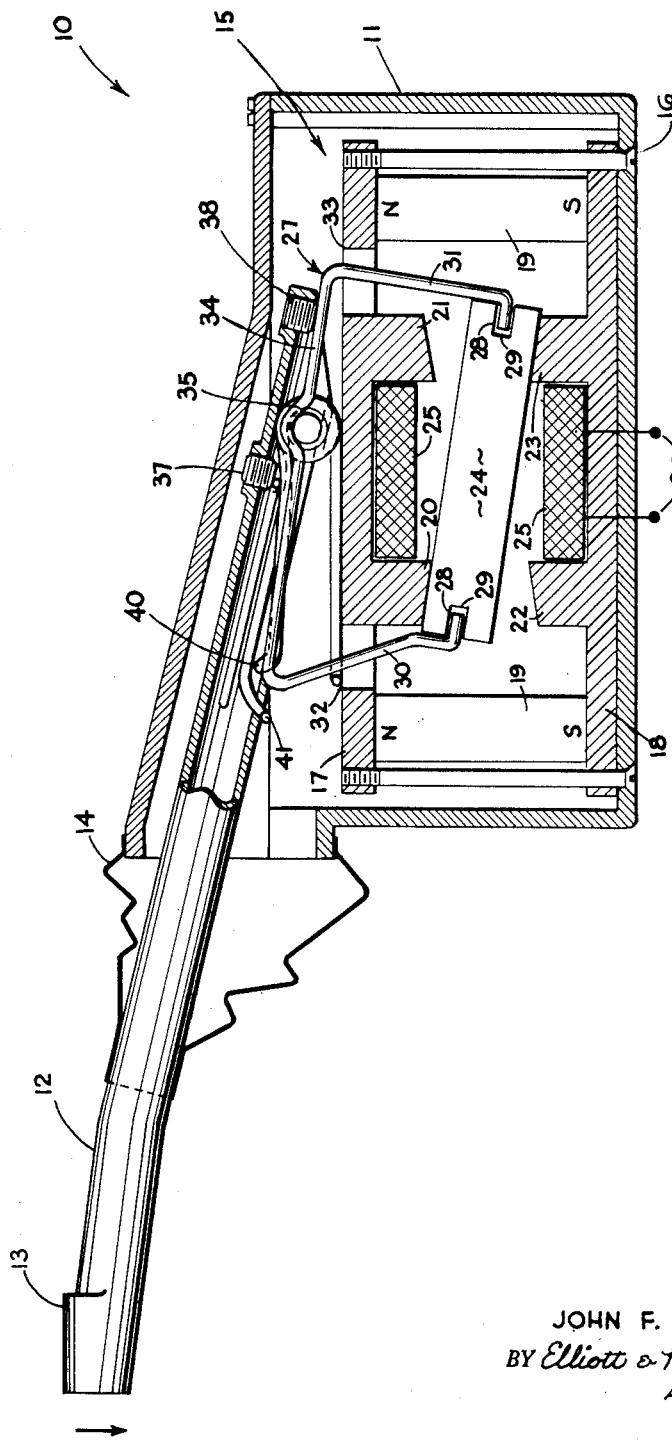
Fig. 1 is a cross-section of a conventional impulse generator of the lever arm and movable core type, showing the improved actuating means mounted therein, and the core disposed in its first given position.

There is shown in Fig. 1 an impulse generator, generally designated by the numeral 10, with an associated housing 11 and a protruding tubular lever arm 12. The lever arm 12 is provided with a butt end 13, which may be forced downwardly in the direction of the arrow by any suitable mechanical device to thereby create a pulse of electrical power. The lever arm 12 is connected into the housing 11 through a flexible boot 14, which effectively seals off the assembly within the housing, while at the same time permitting the necessary limited movement of the lever arm 12.

Positioned within the housing is a magnetic assembly, generally designated by the numeral 15, and secured to the housing 11, as by screws 16. The magnetic assembly 15 includes a top side bar 17 and a bottom side bar 18, both formed of magnetic material. A permanent magnet 19 is rigidly attached to and positioned between each pair of adjacent ends of the side bars 17 and 18. Projecting downwardly from an intermediate portion of the top side bar 17 are poles 20 and 21, and similarly poles 22 and 23 project upwardly from an intermediate portion of the bottom side bar 18.

A core 24 is positioned between the poles of the top side bar 17 and the bottom side bar 18. In Fig. 1, core 24 is shown disposed in its first position or its normal location prior to downward movement of the lever arm 12. In this first position, the core 24 is in contact with pole 21 of the top side bar 17 and pole 23 of the bottom side bar 18. As shown, the end portions of the poles are inclined in order to make full contact with the core.

Disposed around the core 24 in between the poles of the side bars 17 and 18 is a coil 25 having leads 26. Leads 26 have been schematically shown as passing through the base portion of the housing 11 for suitable connection to the particular load to be operated by the impulse generator 10.

The improved actuating means, according to the present invention, is interposed between the lever arm 12 and the core 24. Coupled directly to the core is a U-shaped actuating spring, generally designated by the numeral 27, which has its ends 28 resiliently hooked into holes 29, which are drilled into the end faces of the core 24. The side members 30 and 31 of the actuating spring 27 rise vertically through slots 32 and 33, respectively, which are provided in the top side bar 17. The actuating spring 27 further includes an upper horizontal portion 34, having an arcuate section 35 disposed within the tubular lever arm 12.

Figure 2:
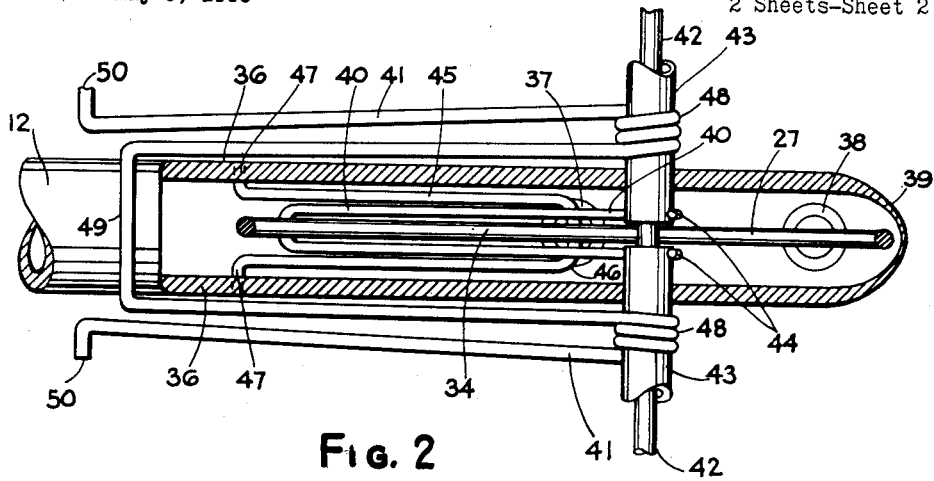
Fig. 2 is a bottom view of the actuating means of Fig. 1.

In order to accommodate the positioning of the arcuate section 35 within the lever arm 12, as well as to accommodate other portions of the actuating means to be hereafter described, a longitudinal section of the bottom periphery of the lever arm 12 is cut away to leave the exposed sidewalls 36 shown clearly in the view of Fig. 2. Axially disposed within this cut away length of the lever arm 12 are adjustable set screws 37 and 38, positioned respectively, on either side of the arcuate section 35 and adapted to transmit force to the horizontal portion 34 of the actuating spring 27. The screw 38 is preferably positioned adjacent the inclined tip portion 39 of the lever arm.

The actuating means includes in addition to the actuating spring 27, a booster spring 40 and a return spring 41. The interrelation of these spring members which comprise the actuating means, and the cooperative functioning with respect to the lever arm 12 may be more clearly described in reference to Fig. 2.

The arcuate section 35 of the horizontal portion of the actuating spring 27 is held in position within the lever arm 12 by a laterally extending pivot rod 42, which may have its ends rigidly secured within or to the side walls of the housing 11. The lever arm 12 is provided with laterally extending trunnions 43 through which the pivot rod 42 passes in journalled relationship. Thus with a vertical force imposed on the butt end 13, to cause downward movement of the lever arm 12, as seen in Fig. 1, the lever arm may pivot about the pivot rod 42.

The booster spring 40 has its terminal ends 44 resiliently positioned partially around the inner portions of the trunnions 43. When not subjected to other forces, the legs of the booster spring 40 extend at an angle downwardly away from the lever arm 12. It will also be noted that the legs of the booster spring pass directly underneath the screw 37.

In order that the screw 37 may be more effectively used as a means of transmitting force to the horizontal portion 34 of the actuating spring 27 and to the legs of the booster spring 40, there is provided a force distributing member 45 disposed within the lever arm 12. This distributing member 45 has a closed end portion 46 and has terminal ends resiliently hooked into the sidewalls of the lever arm 12 as at 47. The closed end portion 46 directly acts to laterally extend the downward force of screw 37 so that the force will be distributed on the legs of the booster spring 40 as well as on the actuating spring 27. As evident in the view of Fig. 2, the horizontal portion 34 of the actuating spring 27 is centrally disposed between the legs of the booster spring 40 so that the legs of the booster spring and horizontal portion 34 form a three point force contact against the closed end 46 of the force distributing member 45.

The return spring 41 includes two coiled portions 48 coaxially positioned, as shown in Fig. 2, about respective laterally projecting trunnions 43. The return spring 41 further has a closed end portion 49 adapted to press against the bottom peripheral surface of the lever arm 12, and two terminal end portions 50 adapted to rest on and slide along the top surface of the top side bar 17. In the view of Fig. 2, these terminal ends 50 have been shown spaced apart; however, in assembled position they may be bent together so as to assure that they will not slide off the top side bar 17.

Figure 3:
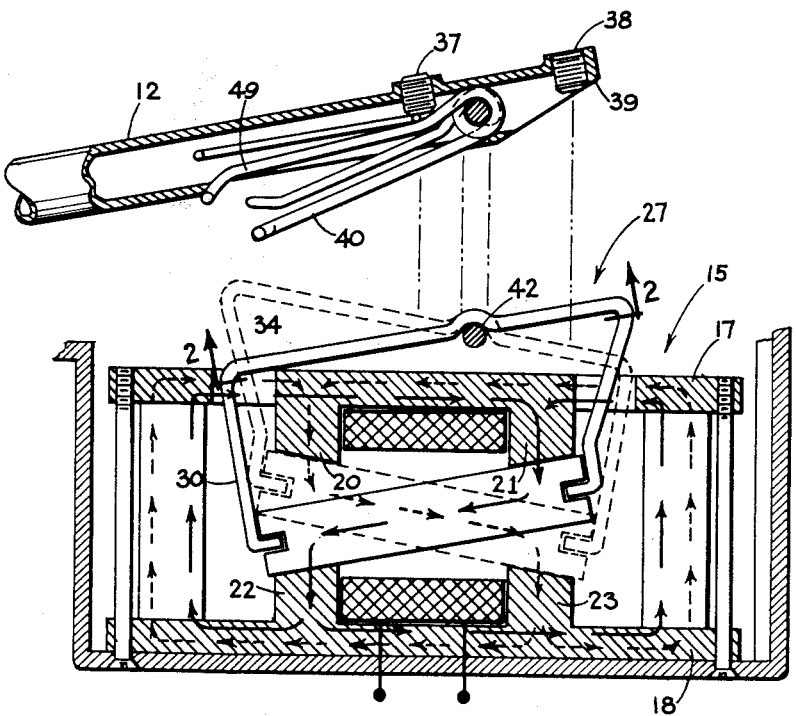
Fig. 3 is a partially exploded view of a portion of the impulse generator of Fig. 1, illustrating the interrelation of the various elements of the actuating means with the core in its second given position.

In the view of Fig. 3, the core 24 has been shown in its operated or second given position, as indicated by the solid lines. In this position, the core 24 is in contact with pole 21 of the top side bar 17 and with pole 22 of the bottom side bar 18. As such the core forms a part of a closed magnetic circuit, indicated schematically by the solid line arrow paths of flux. The lever arm 12 has correspondingly been shown in its depressed position, that is, in its position after a mechanical force has been applied to the butt end 13 to force the lever arm 12 downwardly. This position, however, will only be maintained momentarily, for the upward force of the return spring 41 on the bottom of the lever arm 12 will immediately return the core 24 to its first given position as a result of upward actuation of the level arm. Thus, the core 24 will again be in the position shown in Fig. 1, and in the position shown in Fig. 3 by the dotted lines. In this dotted line position, the flux path will be reversed as indicated by the dotted line arrows.

In operation, the core 24 is normally disposed, as heretofore stated, in its first given position as shown in the view of Fig. 1. In this position, the closed end 49 of the return spring 41 is exerting an upward force of relatively high magnitude on the bottom surface of the lever arm 12. There is also the force of magnetic attraction between the poles 20 and 23, and the core 24 tending to hold the core 24 in this first given position. Opposing these forces is the force of the booster spring 40 which has its closed end pressing downwardly on the horizontal portion 34 near the side member 30 of the actuating spring 27. The force of the booster spring 40, however, is of relatively low magnitude. Thus, in order to operate the impulse generator 10, a downward mechanical force must be applied to the butt end 13 of the lever arm 12 sufficient together with the booster spring 40 to overcome the sum of the forces of the return spring 41 and the magnetic attraction on the core 24.

It will also be evident from the views of Fig. 1 and Fig. 3 that the actuating spring 27, itself, will be exerting a slight force tending to centrally position the core 24 between the poles 20 and 22, and 21 and 23. This force, however, will be relatively insignificant in actual practice, since the spacing between opposite poles will be quite small, as contrasting the spacing shown in the drawings for illustrative purposes.

Upon exertion of a mechanical force on the lever arm 12 in the direction of the arrow in Fig. 1, the lever arm will move downwardly, transmitting a downward force through the screw 37 and member 45 to the horizontal portion 34 of the actuating spring 27 and to the booster spring 40. This downward force, together with the added pre-loading effect of the closed end of the booster spring 40, will flex the portion 34 until the resultant force in side member 30 overcomes the magnetic attraction of the core 24 to poles 20 and 23. At this instant, the closed end of the booster spring 40 pressing against the horizontal portion 34 will suddenly snap the core 24 towards its second given position. This snap-like action imparted to the core 24 by the booster spring 40 results in a relatively high rate of change of flux as the core moves into its second given position into contact with poles 21 and 22. As the core reverses its position, there will be induced in the coil 25 a given current, which will be conducted to leads 26 for application to the load.

It will also be apparent that the booster spring 40 contacts the portion 34 of the actuating spring at a maximum distance from the pivot rod 42 about which the actuating spring will pivot. Thus the moment exerted at the end of portion 34 by the booster spring 40 is considerably greater, for any given force, than at the point where the force transmitted through screw 37 is imparted to the booster spring and the portion 34 of the actuating spring. Thus, a force distribution results which lessens the possibility or fatiguing of the actuating spring.

As the lever arm 12 is being urged downwardly, the return spring 41 at its closed end 49 will be exerting a proportionately greater force upwardly on the bottom surface of the lever arm. Consequently, as soon as the external mechanical force is removed from the end 13 of the lever arm, the return spring will immediately actuate the lever arm 12 back to its original position in Fig. 1. During this actuation, the screw 38 near the tip portion 39 of the lever arm will transmit a downward force on the portion 34 of the actuating spring, which will pivot the actuating spring about the pivot rod 42, and in turn force the core 24 back to its first given position.

The return spring 41 is designed so that it will, as stated heretofore, be exerting a relatively high magnitude of force upwardly on the bottom of the lever arm 12. This is essential so that there is no possibility of accidental tripping of the lever arm without a prescribed downward mechanical force on the end 13. In addition, the screws 37 and 38 are adjustable so that the force transmitted at these points may be varied if desirable.

It should be noted that although in aircraft applications the lever arm 12 is usually actuated by a mechanical force, the spring characteristics of the actuating means are such that the lever arm may also be manually operated.

From the foregoing description, it will be apparent that the improved actuating means of the present invention may be assembled compactly into a small space within an impulse generator without appreciably increasing the weight of the impulse generator. In addition, the improved actuating means may be operated by a small mechanical or manual force and yet provide a relatively high speed of core movement and resulting wattage output. Further than this, the actuating means incorporates a self-restoring component.

It will be appreciated that various modifications and changes may be made within the scope and spirit of the present invention, and the features of the improved actuating means are not therefore to be thought of as limited to the preferred embodiment described in connection with the drawing.

What is claimed is:

1. In an impulse generator including a core, and a lever arm adapted to effect movement of said core from a first given position to a second given position when said lever arm is forced downwardly, actuating means interposed between said lever arm and said core for effecting said movement and for thereafter automatically returning said lever arm to said first given position, said actuating means comprising: an actuating spring coupled to said core and having one portion so disposed as to bias said core towards said second given position in response to downward movement of said lever arm, said actuating spring having another portion so disposed as to bias said core towards said first given position in response to upwardly movement of said lever arm; a booster spring coupled to said lever arm, said booster spring having a portion so disposed as to preload said one portion of said actuating spring; and, means within said impulse generator for automatically returning said lever arm to said first given position after it has been forced downwardly to said second position.

2. In an impulse generator including a core, and a lever arm adapted to effect movement of said core from a first given position to a second given position when said lever arm is forced downwardly, actuating means interposed between said lever arm and said core for effecting said movement and for thereafter automatically returning said lever arm to said first given position, said actuating means comprising; an actuating spring coupled to said core and having one portion so disposed as to bias said core towards said second given position in response to downward movement of said lever arm, said actuating spring having another portion so disposed as to bias said core towards said first given position in response to upwardly movement of said lever arm; a booster spring coupled to said lever arm, said booster spring having a portion so disposed as to preload said one portion of said actuating spring; and, a return spring coupled to said lever arm, said return spring having a portion so disposed as to bias lever arm upwardly.

3. In an impulse generator including a core, and a lever arm adapted to effect movement of said core from a first given position to a second given position when said lever arm is forced downwardly about a given pivot point, actuating means interposed between said lever arm and said core for effecting said movement and for automatically returning said lever arm to said first given position, said actuating means comprising: an actuating spring coupled to said core and having one portion so disposed as to bias said core towards said second given position in response to downward movement of said lever arm, said actuating spring having another portion so disposed as to bias said core towards said first given position in response to upwardly movement of said lever arm; a booster spring coupled to said lever arm at said pivot point, said booster spring having a portion so disposed as to preload said one portion of said actuating spring; and, a return spring coupled to said lever arm at said pivot point, said return spring having a portion so disposed as to bias said lever arm upwardly.

4. In an impulse generator including a core and a lever arm adapted to effect movement of said core from a first given position to a second given position when said lever arm is forced downwardly about a given pivot point, actuating means interposed between said lever arm and said core for effecting said movement and for automatically returning said lever arm to said first given position, said actuating means comprising: a U-shaped actuating spring, defined by a horizontal portion and two side members, said side members having their ends resiliently coupled to said core, and said horizontal portion disposed so as to bias said core towards said second given position in response to downward movement of said lever arm and to bias said core towards said first given position in response to upwardly movement of said lever arm; a booster spring coupled to said lever arm at said pivot point and exerting a force on said horizontal portion in a direction biasing said core towards said second given position; and, a return spring coupled to said lever arm at said pivot point, said return spring having a portion so disposed as to bias said lever arm upwardly.

5. Actuating means for an impulse generator, according to claim 4, in which said actuating means further include: a tubular end portion of said lever arm disposed within said impulse generator, said tubular end portion having a longitudinal section of its bottom periphery cut away, said pivot point being located within said tubular portion; coupling means associated with said lever arm at said pivot point for cooperation with said actuating spring, booster spring, and return spring.

6. Actuating means for an impulse generator according to claim 5, in which said coupling means comprise: two trunnions projecting laterally from said lever arm at said pivot point, said trunnions having portions extending inwardly within said tubular portion and terminating a given axial distance apart; and, a pivot rod coaxially disposed within and extending through said trunnions, said pivot rod having its ends secured within said impulse generator.

7. Actuating means for an impulse generator, according to claim 5, in which said horizontal portion of said actuating spring includes an arcuate section disposed within said tubular end portion of said lever arm and positioned partially around said pivot rod within said given axial distance, whereby said actuating spring may pivot about said pivot rod.

8. Actuating means, according to claim 5, in which said booster spring is defined by a closed end and two connecting leg members, said leg members having terminal ends resiliently positioned partially around said portions of said trunnions extending inwardly, and said closed end disposed in biasing contact with said horizontal portion of said actuating spring.

9. Actuating means, according to claim 5, in which said return spring is defined by two coil portions, a closed end portion connected to said coil portions, and two terminal end portions connected, respectively, to said coil portions, said coil portions being coaxially, respectively, positioned about said laterally projecting trunnions, and said closed end portion being disposed in biasing contact with said lever arm.

10. In an impulse generator including a core, and a lever arm adapted to effect movement of said core from a first given position to a second given position when said lever arm is forced downwardly about a given pivot point, actuating means interposed between said lever arm and said core for effecting said movement, said actuating means comprising: an actuating spring coupled to said core and having one portion so disposed as to bias said core towards said second given position in response to downward movement of said lever arm, said actuating spring having another portion so disposed as to bias said core towards said first given position in response to upwardly movement of said lever arm; a booster spring coupled to said lever arm at said pivot point, said booster spring having a portion so disposed as to preload said one portion of said actuating spring; a tubular end portion of said lever arm disposed within said impulse generator, said tubular end portion having a longitudinal section of its bottom periphery cut away; a first force transmitting means associated with said tubular end portion of said lever arm for acting on said one portion of said actuating spring in response to said downward movement of said lever arm; and a second force transmitting means associated with said tubular end portion for acting on said another portion of said actuating spring in response to upwardly movement of said lever arm.

11. Actuating means, according to claim 10, in which said booster spring has leg portions so disposed as to be acted upon by said first force transmitting means, whereby a force distribution results in said leg portions and said one portion of said actuating spring.

12. Actuating means, according to claim 10, in which said first force transmitting means and said second force transmitting means include adjustable screws, respectively, disposed on either side of said pivot point within the upper periphery of said tubular member and extending downwardly therein to terminate above said cutaway section.

13. In an impulse generator including a core, and a lever arm adapted to effect movement of said core from a first given position to a second given position when said lever arm is moved in a given direction, actuating means interposed between said lever arm and said core for effecting said movement, said actuating means comprising: an actuating spring coupled to said core and having one portion so disposed as to bias said core towards said second given position in response to movement of said lever arm in said given direction, said actuating spring having another portion so disposed as to bias said core towards said first given position in response to movement of said lever arm in another direction; and, a booster spring coupled to said lever arm, said booster spring having a portion so disposed as to pre-load said one portion of said actuating spring.

14. In an impulse generator including a core, and a lever arm adapted to effect movement of said core from a first given position to a second given position when said lever arm is moved in a given direction, actuating means interposed between said lever arm and said core for effecting said movement and for automatically returning said lever arm to said first given position, said actuating means comprising: an actuating spring coupled to said core and having one portion so disposed as to bias said core towards said second given position in response to movement of said lever arm in said given direction, said actuating spring having another portion so disposed as to bias said core towards said first given position in response to movement of said lever arm in another direction; and, a return spring coupled to said lever arm, said return spring having a portion so disposed as to bias said lever arm in said another direction.

References Cited in the file of this patent

UNITED STATES PATENTS

| | | |
|---|---|---|
| 2,135,843 | Pye | Nov. 8, 1938 |
| 2,448,897 | Livingston | Sept. 7, 1948 |